United States Patent
Yeric

(10) Patent No.: US 10,303,840 B2
(45) Date of Patent: May 28, 2019

(54) INTEGRATED CIRCUIT MANUFACTURE USING DIRECT WRITE LITHOGRAPHY

(71) Applicant: ARM Limited, Cambridge (GB)

(72) Inventor: Gregory Munson Yeric, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/498,804

(22) Filed: Apr. 27, 2017

(65) Prior Publication Data

US 2017/0228493 A1   Aug. 10, 2017

Related U.S. Application Data

(62) Division of application No. 13/944,129, filed on Jul. 17, 2013, now Pat. No. 9,672,316.

(51) Int. Cl.
| | |
|---|---|
| G03F 7/20 | (2006.01) |
| G06F 17/50 | (2006.01) |
| H01L 21/66 | (2006.01) |
| H01L 21/027 | (2006.01) |

(52) U.S. Cl.
CPC ...... G06F 17/5081 (2013.01); G03F 7/70383 (2013.01); G03F 7/70433 (2013.01); H01L 21/027 (2013.01); H01L 22/14 (2013.01); H01L 22/20 (2013.01); G06F 2217/12 (2013.01)

(58) Field of Classification Search
USPC .......................................... 716/112
See application file for complete search history.

(56) References Cited

U.S. PATENT DOCUMENTS

| | | | |
|---|---|---|---|
| 5,512,397 A | 4/1996 | Leedy | |
| 6,962,875 B1 | 11/2005 | Stamper | |
| 7,262,070 B2 | 8/2007 | Doros et al. | |
| 8,180,141 B2 | 5/2012 | Lin et al. | |
| 8,229,588 B2 | 7/2012 | Tsen et al. | |
| 2003/0233630 A1* | 12/2003 | Sandstrom | G03F 7/70291 716/50 |
| 2006/0036979 A1* | 2/2006 | Zurbrick | G03F 1/72 700/110 |

(Continued)

FOREIGN PATENT DOCUMENTS

| | | |
|---|---|---|
| CN | 1425197 | 6/2003 |
| CN | 101002141 | 7/2007 |

(Continued)

OTHER PUBLICATIONS

Australian Examination Report dated Jun. 6, 2017 in AU 2014291840, 4 pages.

(Continued)

*Primary Examiner* — Mohammed Alam
(74) *Attorney, Agent, or Firm* — Nixon & Vanderhye P.C.

(57) ABSTRACT

Integrated circuits are manufactured using a direct write lithography step to at least partially form at least one layer within the integrated circuit. The performance characteristics of an at least partially formed integrated circuit are measured and then the layout design to be applied with a direct write lithography step is varied in dependence upon those performance characteristics. Accordingly, the performance of an individual integrated circuit, wafer of integrated circuits or batch of wafers may be altered.

8 Claims, 5 Drawing Sheets

(56) References Cited

U.S. PATENT DOCUMENTS

| | | | |
|---|---|---|---|
| 2007/0050738 A1* | 3/2007 | Dittmann | G06F 17/50 716/106 |
| 2008/0028345 A1 | 1/2008 | Suri et al. | |
| 2008/0119956 A1* | 5/2008 | Mangell | H01L 23/544 700/121 |
| 2009/0096351 A1* | 4/2009 | Hampden-smith | H01L 33/405 313/504 |
| 2010/0228370 A1 | 9/2010 | Tsen et al. | |

FOREIGN PATENT DOCUMENTS

| | | |
|---|---|---|
| CN | 102 707 581 | 10/2012 |
| EP | 2 203 529 | 7/2010 |
| EP | 1 834 358 | 1/2012 |
| JP | 63-274156 | 11/1988 |
| JP | H3-38862 | 2/1991 |
| JP | H06-69345 | 3/1994 |
| JP | H08-272480 | 10/1996 |
| JP | H10-112504 | 4/1998 |
| JP | 2000-200812 | 7/2000 |
| JP | 2003-520451 | 7/2003 |
| JP | 2005-268774 | 9/2005 |
| JP | 2007-59785 | 3/2007 |
| JP | 2008-11323 | 1/2008 |
| JP | 2010-238797 | 10/2010 |
| JP | 2010-251468 | 11/2010 |
| JP | 2011-77423 | 4/2011 |
| JP | 2012-137986 | 7/2012 |
| KR | 10-1101698 | 12/2011 |
| TW | 200705229 | 2/2007 |
| TW | 200935265 | 8/2009 |
| WO | WO 89/11659 | 11/1989 |
| WO | WO 97/45770 | 12/1997 |
| WO | WO 2009/052120 | 4/2009 |

OTHER PUBLICATIONS

Taiwanese Office Action dated Feb. 12, 2018 in TW Application No. 103116991 and English translation, 29 pages.
Singaporean Office Action dated Mar. 28, 2018 in SG Application No. 11201600093P, 7 pages.
Japanese Office Action dated May 25, 2018 in JP Application No. 2016-526688 and English translation, 7 pages.
U.S. Appl. No. 13/944,129, filed Jul. 17, 2013, Inventor: Yeric.
Office Action dated Jan. 30, 2015 in co-pending U.S. Appl. No. 13/944,129 14 pages.
Office Action dated May 18, 2016 in co-pending U.S. Appl. No. 13/944,129 15 pages.
Black et al., "Supplemental multilevel interconnects by laser direct writing: Application to GaAs digital integrated circuits", *Lincoln Lab, Massachusetts Institute of Technology*, Feb. 1987, 3 pages.
Ehrlich et al., "Emerging technology for in situ processing: Patterning alternatives", *Lincoln Lab, Massachusetts Institute of Technology*, Feb. 1988, 5 pages.
International Search Report and Written Opinion of the International Searching Authority dated Sep. 24, 2014 in PCT/GB2014/051398, 10 pages.
Chinese Office Action dated Jan. 25, 2017 in CN 201480038762.9 and English translation, 12 pages.
Chinese Second Office Action dated Aug. 1, 2017 in CN 201480038762.9 and English translation, 8 pages.
Japanese Office Action dated Sep. 22, 2017 in JP 2016-526688 and English translation, 9 pages.
Written Opinion dated Jan. 8, 2019 in SG Application 11201600093P, 6 pages.

\* cited by examiner

INTEGRATED CIRCUIT MANUFACTURE USING DIRECT WRITE LITHOGRAPHY

This application is a divisional of U.S. patent application Ser. No. 13/944,129 filed Jul. 17, 2013, the entire content of which is hereby incorporated by reference in this application.

BACKGROUND

This invention relates to the field of manufacturing integrated circuits. More particularly, this invention relates to the use of direct write lithography techniques as part of integrated circuit manufacture.

It is known to manufacture integrated circuits using a sequence of masks for forming different layers within the integrated circuit. The manufacture of suitable masks is a time consuming and expensive operation.

It is known to utilise direct write lithography during the manufacture of integrated circuits. In particular, it is known to use techniques such as direct write electron beam lithography to correct manufacturing defects in individual integrated circuits that have been manufactured. As an example, if an integrated circuit has been manufactured with a short circuit between two printed features, then direct write electron beam lithography may be used to remove that short circuit and restore proper operation to the integrated circuit. Such operations provide defect correction within a fixed layout design.

Other direct write lithographic techniques are known. These include inkjet circuit printing and aerosol jet circuit printing. These techniques are becoming increasingly capable of producing circuits of small size to the extent that they may be used to manufacture integrated circuits.

A problem that is increasing as process size decreases in integrated circuit manufacture is that of unwanted variability in the size and positioning of circuit features. This can reduce the yield of correctly operating integrated circuits and adversely affect the performance characteristics of integrated circuits taking them outside of a desired range.

SUMMARY

Viewed from one aspect the present invention provides a method of manufacturing integrated circuits having one or more layers with a respective layout design at least partially formed using a direct write lithography step, said method comprising the steps of:
measuring one or more performance characteristics of an at least partially formed integrated circuit;
changing said layout design of at least one of said one or more layers to be formed using said direct write lithography step in dependence upon said one or more performance characteristics to generate a changed layout design; and
forming said at least one of said one or more layers using said step of direct write lithography in accordance with said changed layout design.

The present technique uses direct write lithography in the manufacture of at least part of at least one layer within the integrated circuit. A performance characteristic of the integrated circuit is measured and the layout design of one or more layers to be formed using the direct write lithography is changed in dependence upon the measured performance characteristic. Thus, the layout design to which the integrated circuit is manufactured is modified in dependence upon measured performance characteristics of an at least partially formed integrated circuit. As direct write lithography does not use fixed and expensive masks, it is practical to modify the layer formed using direct write lithography in response to measured performance characteristic feedback on an individual integrated circuit basis, on the basis of individual wafers of integrated circuits, or on the basis of batches of wafers. The present techniques may be used to alter the design of a partially manufactured integrated circuit. The present techniques may also be used to alter the design of subsequently manufactured integrated circuits, i.e. not the individual integrated circuit that was subject to performance measurement.

The changing of the layout design may be performed as an automatic feedback process in accordance with a predetermined rule. For example, rules may be established whereby if a particular portion of the integrated circuit is operating too slowly or too quickly, then predetermined changes can be made which are known to alter the speed of operation in the desired sense.

The layers which are formed by direct write lithography may be partially formed by the direct write lithography and partially by mask based lithography. Direct write lithography may be slower than mask based lithography and accordingly direct write lithography may be utilised on a restricted basis for those portions of a layer for which it is desired to be able to dynamically change the layout design.

As previously mentioned, the direct write lithography may take a variety of different forms. For example, the direct write lithography may be one of direct light electron beam lithography, direct write inkjet circuit printing and direct write aerosol jet circuit printing (gravure and intaglio printing technologies).

The layout design used by direct write lithographic techniques is typically provided in the form of a computer file for controlling a direct write lithography machine. A change to the layout design may be conveniently and inexpensively made by changing the computer file for driving such a machine (optionally using the predetermined rules mentioned above).

The one or more performance characteristics which are measured can take a variety of different forms. For example, minimum operating voltage may be a measured parameter. However, a performance characteristics well suited for adjustment using changes to the design layout is that of the speed of operation of at least a portion of the integrated circuit.

The step of measuring may be performed on a fully completed or partially completed integrated circuit. It is convenient that the measuring is performed after forming a first metal layer within an integrated circuit and prior to completing manufacture of the integrated circuit. After formation of the first metal layer, useful information can be gathered regarding the performance characteristics of the integrated circuit formed up to that point and any adjustments to the layout design which may be made can take effect in the subsequently formed layers to bring the measured performance characteristics back to a desired level if necessary.

The measuring of the performance characteristics may be performed using one or more test circuit areas located within the integrated circuit. Specific canary circuits may, for example, be included for the purposes of measuring the speed of operation of an individual integrated circuit to gather information that may be used to alter the circuit layout.

The changes to the layout design may be made in a variety of different ways. Convenient changes to layout design which can have well controlled effects are changes to the second or higher metal layer, a local interconnect layer or a via layer. Changing the electrical connections within the integrated circuit design in this way may be used to provide relatively deterministic changes to the performance characteristics of the integrated circuit.

Examples of the changes to the layout design which may be made include changing a number of gate fingers connected within a buffer circuit thereby changing the drive strength of the buffer circuit. Another design change which may be made within an integrated circuit including a plurality of instances for circuit element is to change the number of those instances of the circuit element connected so as to be active during operation of the integrated circuit. Thus, for example, a number of inverters used to drive a node may be changed by changing the layout in a manner which brings the drive strength of that node to a desired level.

Another change to the layout design which can alter the performance characteristics in a desired manner is to change one or more interconnect lines within the integrated circuit so as to alter the resistance and/or capacitance of those interconnect lines.

When the interconnect lines comprise one or more parallel interconnect lines, the configuration that may be changed is to include or remove connections between those parallel interconnect lines in a manner which changes their resistance and/or capacitance. Another change which may be made to interconnect lines is to change their transverse cross sectional area in a manner that can change their resistance and/or capacitance.

The capacitance associated with an integrated line, and accordingly its speed, may be changed by including shielding of the interconnect line that changes in its effectiveness, e.g. providing a shielding conductor which is changed from having a floating potential to a grounded potential.

Viewed from another aspect the present invention provides a method of manufacturing integrated circuits having one or more layers with a respective layout design at least partially formed using a direct write lithography step, said method comprising the steps of:

changing said layout design of at least one of said one or more layers to be formed using said direct write lithography step to configure one or more circuit elements within said integrated circuit to generate an electrically readable identifier for said integrated circuit; and forming said at least one of said one or more layers using said direct write lithography step in accordance with said changed layout design.

The direct write lithographic techniques applied during manufacture to change the design of an integrated circuit layout may be used to provide an electrically readable identifier for an integrated circuit that is built in during manufacture by virtue of the layout design used, e.g. integrated circuits could be signed and/or dated using changes in the layout design permitted by the use of direct write lithographic techniques. Such changes would not be cost effective if masks needed to be changed as the time taken and cost involved would be too high.

Viewed from a further aspect the present invention provides a method of manufacturing system-on-chip integrated circuits having a plurality of independently designed functional blocks and one or more layers with a respective layout design at least partially formed using a direct write lithography step, said method comprising the steps of:

changing said layout design of at least one of said one or more layers to be formed using said direct write lithography step to change a design of one of said plurality of functional blocks while leaving other of plurality of functional blocks unchanged; and forming said at least one of said one or more layers using said direct write lithography step in accordance with said changed layout design.

The present techniques may be used to update the layout design of a portion of an integrated circuit while leaving other portions of that integrated circuit unaltered. Thus, in a system-on-chip integrated circuit comprising independently designed functional blocks, some of those functional blocks could be formed using direct light lithography in a manner which would permit their design to be changed while other of the functional blocks are left unaltered, e.g. are manufactured by mask based techniques.

Viewed from a further aspect the present invention provides a method of manufacturing integrated circuits having one or more layers with a respective layout design at least partially formed using a direct write lithography step, said method comprising the steps of:

at least partially forming a plurality of instance of said integrated circuit each having a different form of said layout design;

measuring one or more performance characteristics of said plurality instances of said integrated circuit;

selecting as a selected layout design one of said different forms of said layout design of at least one of said one or more layers to be formed using said direct write lithography step in dependence upon said one or more performance characteristics; and forming said at least one of said one or more layers using said step of direct write lithography in accordance with said selected layout design.

It is possible that a plurality of layout designs are formed and tested in advance and then, in dependence upon a measured performance characteristic, the layout design to be used in the further manufacture of that integrated circuit is selected among the plurality of pre-existing layout designs.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
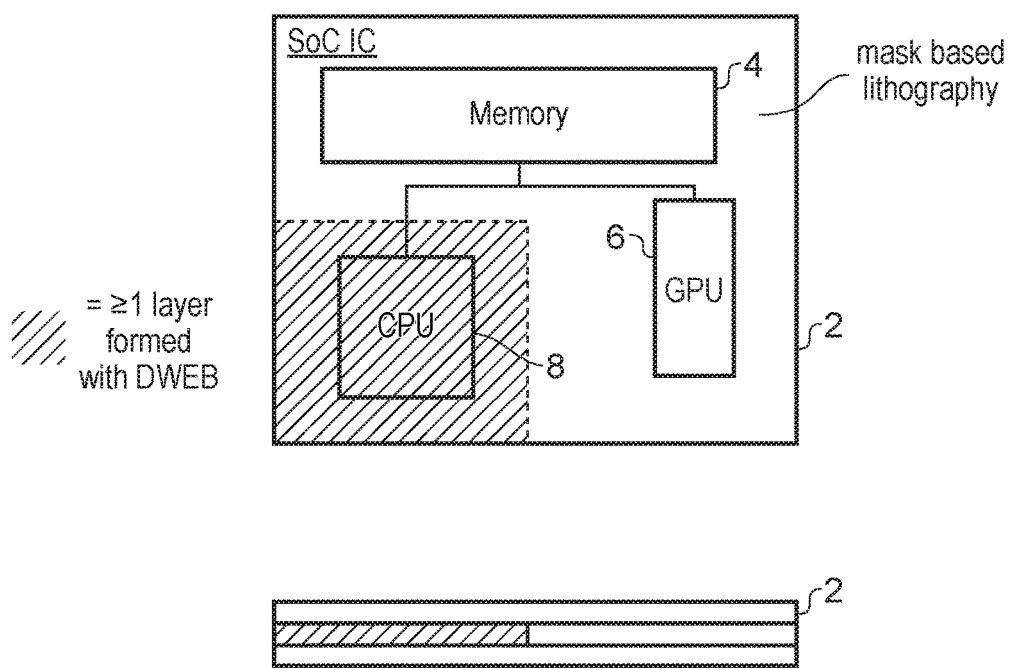
FIG. 1 schematically illustrates a system-on-chip integrated circuit in which one functional block includes a layer manufactured by direct write electron beam lithography.

FIG. 1 schematically illustrates a system-on-chip integrated circuit 2 including a plurality of functional blocks, such as a memory 4, a graphics processing unit 6 and a general purpose processor 8. At least one layer within the general purpose processor 8 is formed using direct write electron beam lithography. The portion of the system-on-chip integrated circuit which is formed using this direct write lithographic technique is illustrated as shaded in FIG. 1. FIG. 1 shows both a plan view and a cross-sectional view of the integrated circuit 2.

Figure 2:
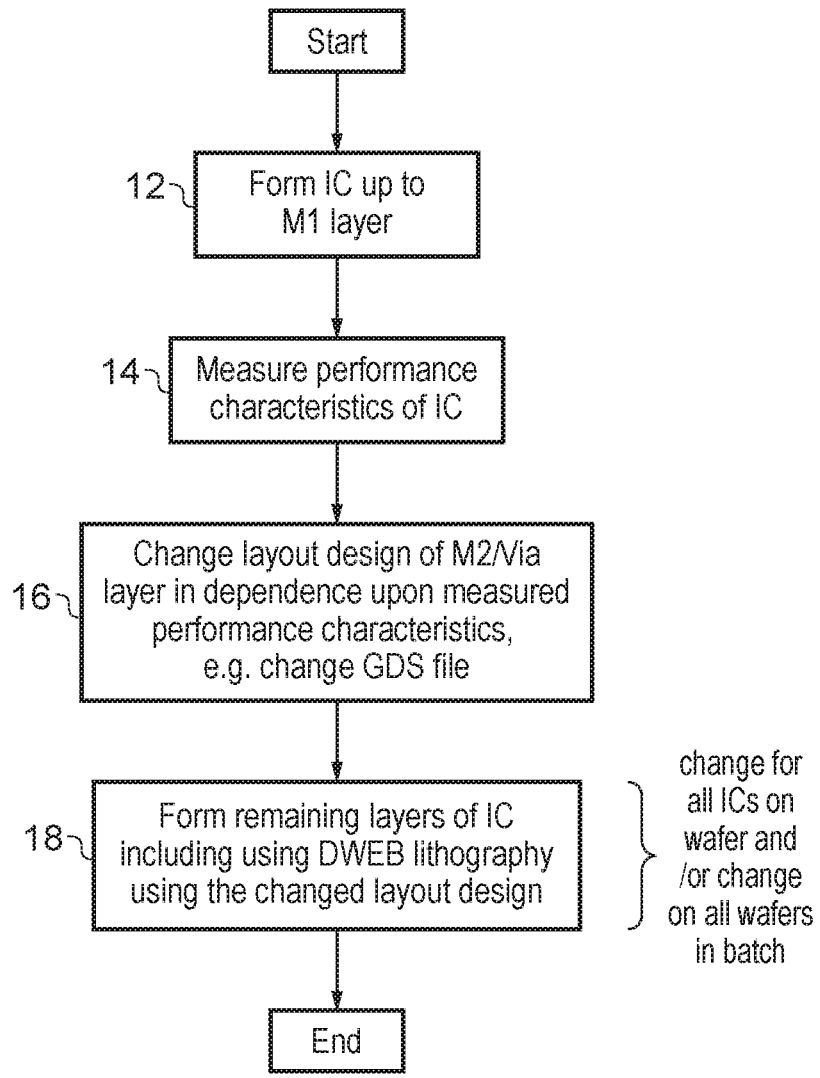
FIG. 2 is a flow diagram schematically illustrating the dynamic alteration of a layout design during manufacture.

FIG. 2 is a flow diagram schematically illustrating a manufacturing process of an integrated circuit in which the layout design of one or more layers may be altered. At step 12 the integrated circuit is formed up to and including the Metal 1 layer. At step 14, one or more performance characteristics of the partially manufactured integrated circuit are measured. These performance characteristics may be measured at predetermined test areas within the integrated circuit, such as specifically provided ring oscillators or canary circuits.

At step 16, the measured performance characteristics are compared with desired performance characteristics and a change in the layout design of the Metal 2 and/or via layer is made in dependence upon those measured performance characteristics. This change in the layout design may be conveniently made by changing an associated GDS file defining the layout design. Direct write electron beam lithography machines may be provided which read GDS files defining circuit layout, fracture those designs and then drive the electron beams to manufacture the appropriate circuit layout layer.

At step 18 the remaining layers of the integrated circuits are manufactured including using the direct write electron beam lithographic technique to form at least part of at least one of the remaining layers that are formed (other techniques such as direct write inkjet circuit printing, direct write aerosol circuit printing and gravure and intaglio printing technologies may also be used).

The changes to the layout design made at step 16 may be made for an individual integrated circuit, all integrated circuits manufactured on the same wafer and/or for all wafers in a given batch of wafers.

Figure 3:
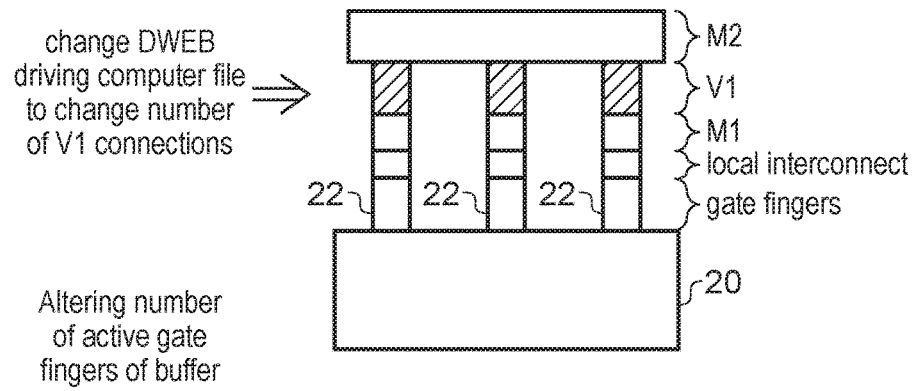
FIG. 3 is a diagram schematically illustrating an example change in layout design that may be used to alter the number of gate fingers that are active within a buffer circuit.

FIG. 3 schematically illustrates the cross-section through a portion of an integrated circuit including a substrate 20 on which are formed a plurality of gate fingers 22. The gate fingers 22 are part of a buffer circuit and the drive strength of that buffer circuit may be altered by changing the number of gate fingers that are active. Individual gate fingers 22 may be made active or inactive by changing whether or not they are connected using the via layer V1 to the Metal 2 layer M2. Thus, in accordance with the present techniques, the layout design may be actively changed following formation of the Metal 1 layer M1 by changing whether or not individual via connections in the V1 layer are made to the Metal 2 layer thereby either connecting or isolating the associated gate finger 22.

Figure 4:
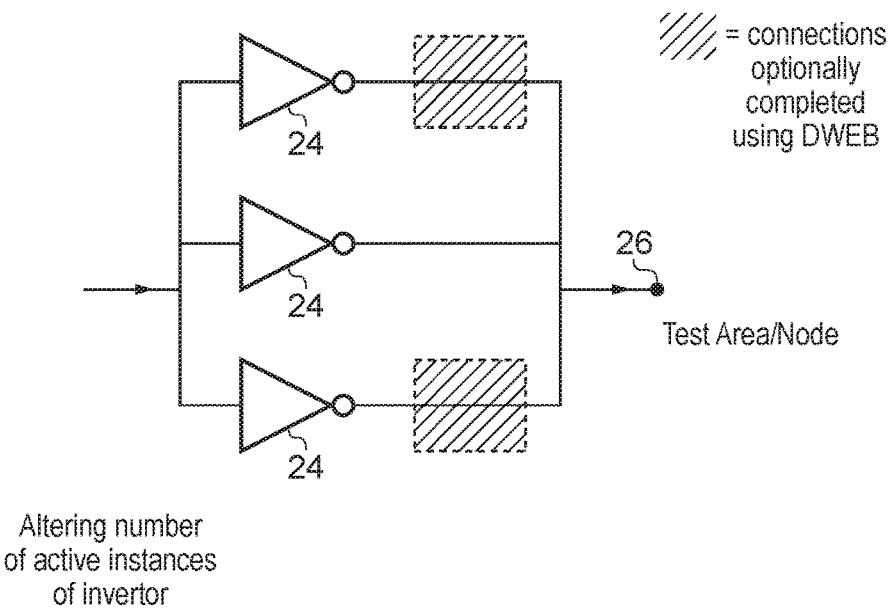
FIG. 4 schematically illustrates a number of instances of an inverter with a change to the layout design formed by direct light electron beam lithography being used to change the number of these instances which are active.

FIG. 4 schematically illustrates a portion of the integrated circuit in which a plurality of instances of an inverter 24 are provided and which may act in parallel to drive a node 26. The node 26 may be a test area used to establish whether the speed of an integrated circuit is nominal. If the speed is too low, then the number of inverters driving that node may be increased. Conversely, if the speed is too high, then the number of inverters driving that node may be decreased. Metal connections between two of the inverters 24 and the node 26 are formed using direct write electron beam lithography and accordingly may be removed by an appropriate change in the layout design so as to change the drive strength applied to the node 26.

Figure 5:
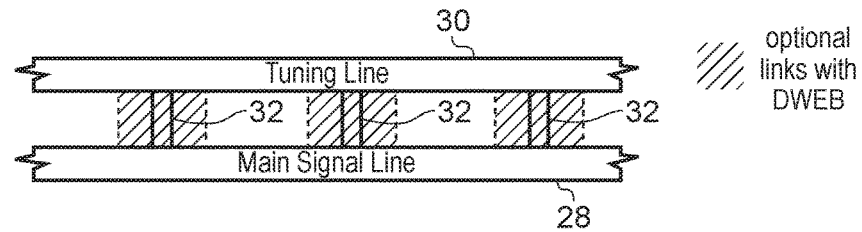
FIGS. 5, 6, 7, 8 and 9 schematically illustrate tuning techniques which may be applied to interconnect lines using connections selectively formed in accordance with direct light electron beam lithography.

FIG. 5 schematically illustrates an interconnect line 28 which is selectively coupled to a tuning line 30 via links 32. The links 32 are formed by direct write electron beam lithography and accordingly the layout design may be dynamically changed to either include or not include individual links 32. Thus, the capacitance and/or resistance (and therefore speed) of the combination of the main signal line 28 and the tuning line 30 may be altered.

Figure 6:
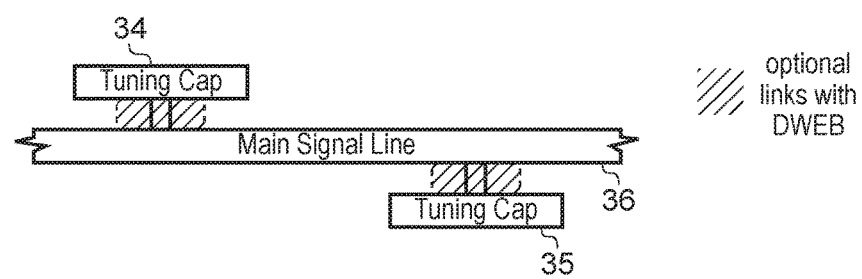

FIG. 6 schematically illustrates a variation upon the arrangement shown in FIG. 5. In this example, the tuning line 30 is replaced by a plurality of tuning capacitances 34, 35 which may be connected or not connected to the main signal line 36 using vias from above or below the turning line 30. Connecting or not connecting a tuning strap 34 alters the capacitance of the main signal line 36 and accordingly the speed with which a signal change is propagated by that main signal line.

Figure 7:
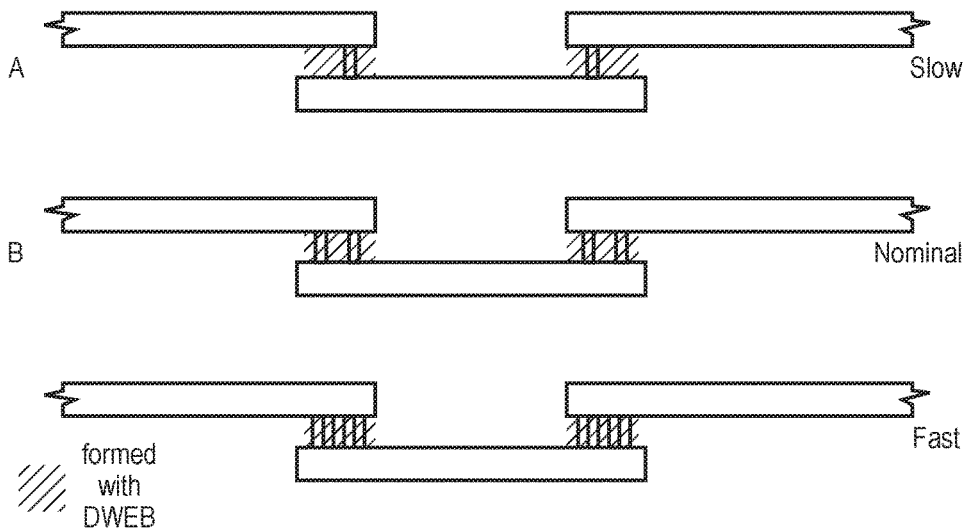

FIG. 7 schematically illustrates another example change in the way that an interconnect line is provided. In this example, the number of connections between the different portions of the interconnect line are altered thereby changing the resistance of the interconnect line. The resistance of the interconnect line is changed to change the speed of propagation of a signal along the signal line and thereby adjust the performance parameters by a change in the layout design (i.e. a number of links between adjacent sections of the interconnect line).

Figure 8:
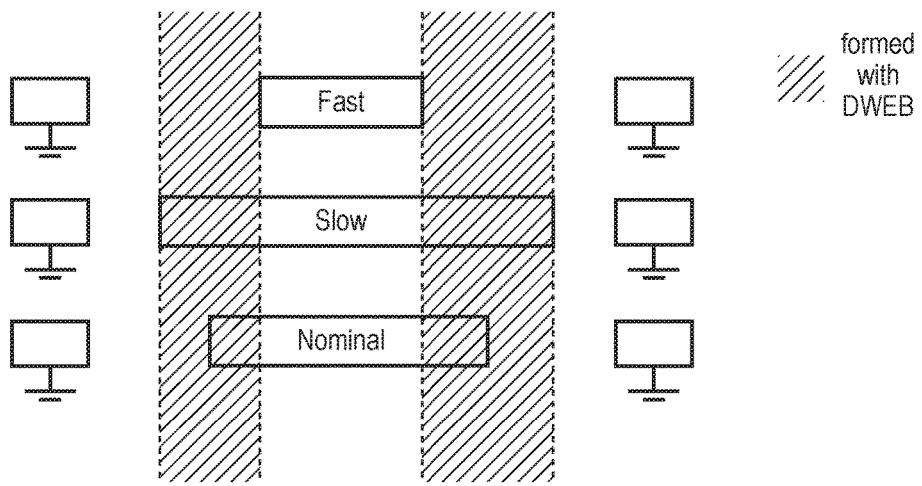

FIG. 8 schematically illustrates another type of variation which may be made to interconnect lines. In this example, the width of the cross-section of the interconnect lines is varied to move their edges closer to or further from shielding lines. Changing the space in between the interconnect line and its shielding changes the speed with which a signal may propagate along that interconnect line. At least the portions of the width of the interconnect line which are to be varied may be formed with direct write electron beam lithography as illustrated and accordingly changed in accordance with the measured performance characteristics of an individual integrated circuit wafer or batch of wafers.

Figure 9:
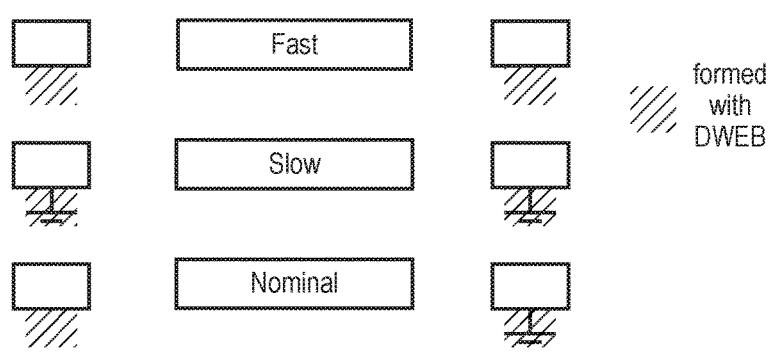

FIG. 9 illustrates a further example of the way in which the performance characteristics of an interconnect circuit may be tuned. In this example, an interconnect line is provided with shielding lines and the layout design is changed by changing whether or not those shielding lines are connected to ground or are allowed to float. Connecting a shielding line to ground will tend to slow down signal propagation along the interconnect line. Accordingly, the fastest interconnect line illustrated in FIG. 9 is the one in which both shielding conductors are floating. The slowest interconnect line is the one in which both shielding conductors are grounded and the nominal interconnect line is the one in which one of the shielding conductors is floating and one of the shielding conductors is grounded.

The layout design of a portion of the integrated circuit formed by direct write lithography may be varied so as to provide a varying electrically readable identifier for the integrated circuit. Thus, any individual integrated circuit, wafer or batch of wafers may have its layout changed to hardwire a particular value into a register which may then be electrically read. In this way, an individual integrated circuit could have a serial number attached to it in a manner which it would not be possible to change without destroying the integrated circuit.

The changes to the layout design of the portion of the integrated circuit manufactured by direct write lithography may have been determined in advance. For example, in the case of FIG. 4, different layout designs may have been formed in advance which respectively connect one, two or three of the inverters 24 to the node 26. When the speed of the partially formed integrated circuit has been determined, and it has been determined how many of the inverters 24 should be connected to the node 26 to achieve the desired performance level, then the appropriate one of these preformed layout designs may be selected for use in the further manufacture of the integrated circuits.

In some embodiments of the technique, integrated circuits manufactured in accordance with a plurality of different layout designs apply using direct beam lithography may be produced and tested. In dependence upon those test results, a particular layout design among those tested may be selected for further use in the series production of the integrated circuit at a wafer or batch level.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of manufacturing integrated circuits having one or more layers with a respective integrated circuit layout design at least partially formed using a direct write lithography step, said method comprising the steps of:
    changing said integrated circuit layout design of at least one of said one or more layers to be formed using said direct write lithography step to configure one or more circuit elements within said integrated circuit to provide an electrically-readable identifier for said integrated circuit; and
    forming said at least one of said one or more layers using said direct write lithography step in accordance with said changed integrated circuit layout design.

2. An integrated circuit formed in accordance with a method as claimed in claim 1.

3. A method of manufacturing system-on-chip integrated circuits having a plurality of independently designed functional blocks and one or more layers with a respective integrated circuit layout design at least partially formed using a direct write lithography step, said method comprising the steps of:
    changing said integrated circuit layout design of at least one of said one or more layers to be formed using said direct write lithography step to change a design of one of said plurality of functional blocks while leaving other of plurality of functional blocks unchanged; and
    forming said at least one of said one or more layers using said direct write lithography step in accordance with said changed integrated circuit layout design.

4. An integrated circuit formed in accordance with a method as claimed in claim 3.

5. A method of manufacturing integrated circuits having one or more layers with a respective integrated circuit layout design at least partially formed using a direct write lithography step, said method comprising:
    measuring one or more performance characteristics of an at least partially formed integrated circuit;
    changing said integrated circuit layout design of at least one of said one or more layers to be formed using said direct write lithography step in dependence upon said one or more performance characteristics to generate a changed layout design; and
    forming said at least one of said one or more layers using said step of direct write lithography in accordance with said changed integrated circuit layout design,
    wherein said at least one of said one or more layers formed using said changed integrated circuit layout design is formed partially by direct-write lithography and partially by mask-based lithography.

6. An integrated circuit formed in accordance with a method as claimed in claim 5.

7. A method of manufacturing integrated circuits having one or more layers with a respective integrated circuit layout design at least partially formed using a direct write lithography step, said method comprising:
    measuring one or more performance characteristics of an at least partially formed integrated circuit;
    changing said integrated circuit layout design of at least one of said one or more layers to be formed using said direct write lithography step in dependence upon said one or more performance characteristics to generate a changed integrated circuit layout design; and
    forming said at least one of said one or more layers using direct write lithography in accordance with said changed integrated circuit layout design,
    wherein said changing is an automatic feedback process performed in accordance with a predetermined rule.

8. An integrated circuit formed in accordance with a method as claimed in claim 7.

* * * * *